(12) United States Patent
LaCour et al.

(10) Patent No.: US 7,931,739 B2
(45) Date of Patent: Apr. 26, 2011

(54) AGGLOMERATE REMOVAL SYSTEM

(75) Inventors: Mark J. LaCour, Katy, TX (US); Max W. Thompson, Sugar Land, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 424 days.

(21) Appl. No.: 12/099,651

(22) Filed: Apr. 8, 2008
(Under 37 CFR 1.47)

(65) Prior Publication Data
US 2009/0250411 A1 Oct. 8, 2009

(51) Int. Cl.
*B01D 45/00* (2006.01)
(52) U.S. Cl. ............... 95/267; 95/273; 96/372; 55/319; 422/147
(58) Field of Classification Search .................... 95/107, 95/108, 109, 110, 273, 267; 96/186, 187, 96/372; 208/211, 212, 213, 217, 226, 243, 208/208 R, 48 R, 432, 435, 951; 585/406, 585/407, 639, 828; 137/13, 240; 196/122; 201/2; 422/147; 55/319
See application file for complete search history.

(56) References Cited

U.S. PATENT DOCUMENTS

| | | | | |
|---|---|---|---|---|
| 2,510,823 | A * | 6/1950 | Krebs | 518/709 |
| 3,804,365 | A | 4/1974 | Fetterolf et al. | |
| 4,248,692 | A * | 2/1981 | Knebel et al. | 208/432 |
| 4,958,527 | A | 9/1990 | Couvillion | |
| 5,675,048 | A * | 10/1997 | Zhang et al. | 585/467 |
| 6,768,036 | B2 * | 7/2004 | Lattner et al. | 585/639 |
| 7,029,571 | B1 * | 4/2006 | Bhattacharyya et al. | 208/76 |
| 7,385,099 | B2 * | 6/2008 | Kuechler et al. | 585/640 |
| 7,414,166 | B2 * | 8/2008 | Beech et al. | 585/638 |
| 2003/0178343 | A1 * | 9/2003 | Chen et al. | 208/213 |
| 2004/0140244 | A1 * | 7/2004 | Sughrue et al. | 208/15 |
| 2009/0107329 | A1 * | 4/2009 | Lee | 95/22 |

OTHER PUBLICATIONS

"Chemical Sampling Systems: A Complete Guide to Sampling Systems". [online] Fetterolf Valve News & Views. vol. VIII, No. 13. [retrieved on Apr. 4, 2008]. Retrieved from the internet: <URL: http://www.fetterolfvalves.com/newsletters.htm>.

"Drain/Sampling Valves". [online] Strahman Valves, Inc., ISO 9001:2000. Apr. 24, 2007. [retrieved on Apr. 24, 2007]. Retrieved from the internet: <URL: http://www.strahmanvalves.com/Front_End/Category.asp?CategoryID=2>.

"Drain/Sampling Valves: Drain Valves". [online] Strahman Valves, Inc., ISO 9001:2000. Apr. 24, 2007. [retrieved on Apr. 24, 2007]. Retrieved from the internet: <URL: http://www.strahmanvalves.com/Front_End/Product.asp?ProductID=56&ProdLineID=28&CategoryID=2>.

Fetterolf Corporation Global Valve Technology Center Overview. [online] www.fetterolfvalve.com. Apr. 26, 2007. [retrieved on Apr. 4, 2008]. Retrieved from the internet: <URl: http://www.fetterolfvalves.com>.

(Continued)

*Primary Examiner* — Duane Smith
*Assistant Examiner* — Minh-Chau Pham
(74) *Attorney, Agent, or Firm* — Hovey Williams LLP

(57) ABSTRACT

An agglomerate removal device for removing agglomerated particles from a solids-containing stream. The agglomerate removal device can include an agglomerate capture device and an agglomerate withdrawal device. In one embodiment, the agglomerate removal device can be utilized in a process for desulfurizing gasoline or diesel streams in order to remove at least a portion of the agglomerated sorbent particles exiting the fluidized bed regenerator.

18 Claims, 8 Drawing Sheets

OTHER PUBLICATIONS

"Line Blind Valves: Solutions for Industries". [online] Strahman Valves, Inc., ISO 9001:2000. Dec. 2006. [retrieved on Apr. 4, 2008]. Retrieved from the internet: <URL: http://www.strahmanvalves.com/pdfs/categories/Line%20Blind%20Brochure.pdf>.

"Ram Type Drain Valves". Strahman Valves, Inc.

"Setting the Standard for Reliability: The Originator of Piston-Type Sampling Valves". [online] Strahman Valves, Inc., ISO 9001:2000. 2005. [retrieved on Apr. 4, 2008]. Retrieved from the internet: <URL: http://www.strahmanvalves.com/pdfs/categories/Sampling%20Valve%20Catalog.pdf>.

"Strahman Drain Valve". [online] Process Controls Corp. Dec. 13, 2007. [retrieved on Apr. 4, 2008]. Retrieved from the internet: <URL: http://www.processcontrolscorp.com/strahman.htm>.

* cited by examiner

AGGLOMERATE REMOVAL SYSTEM

BACKGROUND OF THE INVENTION

1. Field of the Invention

This invention relates to processes and apparatuses for removing agglomerated particles from a fluid stream. In another aspect, the invention concerns removing agglomerates from a solid-containing stream withdrawn from a fluidized bed regenerator.

2. Description of the Related Art

In processes employing a plurality of fluidized solid catalyst and/or sorbent particles (i.e., a fluidized bed process), two or more of the particles may become chemically and/or physically fused together during operation. These agglomerated particles (i.e., agglomerates) can plug downstream process piping and equipment, resulting in a number of operational problems and contributing to increased operation expenses.

Several factors contribute to the formation of agglomerates in a fluidized bed process. One of the most common causes of particle agglomeration is the presence of water, which can enter the process in a number of ways. For example, water may be liberated from fresh catalyst or sorbent particles added to the system, particularly if the particles are at least partially hygroscopic. Water can enter the system through piping and equipment leaks, such as, for example, leaks from steam- or water-cooled vessels or exchangers. Depending on the reaction(s) occurring in the process, water may be the result of a main or side chemical reaction and may actually be synthesized within the system. When coupled with additional contributing factors, such as, for example high temperatures and high pressures, the rate of water-initiated agglomerate formation can be accelerated even further.

One proposed solution for removing agglomerates from a solids-containing stream in a fluidized bed process involves the use of an in-line filter (i.e., screen) that captures and retains the agglomerates, while allowing the fluid stream to pass therethrough. In order to remove the trapped agglomerates, the process is shut down in order to disconnect the surrounding piping and remove the filter so that the agglomerates can be manually removed from the screen. Because this proposed solution requires the process to be shut down and the process piping to be disassembled, this solution is labor-intensive, time-consuming, and relatively expensive. In addition, the screens used in the filters are often fragile and susceptible to damage, thereby rendering the filter ineffective. However, the use of a more robust screen often results in a higher frequency of clogging, which results in more required cleanings, thereby increasing the number of process interruptions.

SUMMARY OF THE INVENTION

In one embodiment of the present invention, there is provided a process for removing agglomerated solids from a solids-containing stream, the process comprising: (a) passing the solids-containing stream from a first vessel to an agglomerate removal device via a first conduit, wherein the solids-containing stream comprises a plurality of solid particles and a plurality of solid agglomerates, wherein each of the agglomerates is formed from two or more solid particles that have fused together; (b) trapping at least a portion of the agglomerates in the agglomerate removal device to thereby provide a plurality of trapped agglomerates and an agglomerate-depleted stream; (c) passing at least a portion of the agglomerate-depleted stream to a second vessel via a second conduit; and (d) removing at least a portion of the trapped agglomerates from the agglomerate removal device, wherein the removing of step (d) is accomplished without physically decoupling the first conduit from the first vessel, wherein the removing of step (d) is accomplished without physically decoupling the first conduit from the agglomerate removal device, wherein the removing of step (d) is accomplished without physically decoupling the second conduit from the agglomerate removal device, and wherein the removing of step (d) is accomplished without physically decoupling the second conduit from the second vessel.

In another embodiment of the present invention, there is provided a process for removing agglomerated sorbent particles from a regenerated sorbent effluent stream withdrawn from a fluidized bed regenerator, the process comprising: (a) withdrawing the regenerated sorbent effluent stream from the fluidized bed regenerator, wherein the regenerated sorbent effluent stream comprises a plurality of solid sorbent particles and a plurality of solid sorbent agglomerates, wherein each of the sorbent agglomerates is formed from two or more solid sorbent particles that have fused together; (b) transporting at least a portion of the regenerated sorbent effluent stream to a receiving vessel via a solids transport system, wherein the solids transport system comprises an agglomerate removal device and an isolation system; (c) simultaneously with step (b), trapping at least a portion of the solid sorbent agglomerates in the agglomerate removal device to thereby provide a plurality of trapped agglomerates; (d) isolating the agglomerate removal device from fluid flow communication with the regenerator and the receiver via the isolation system; and (e) passing a purge gas through the agglomerate removal device to remove at least a portion of the trapped agglomerates from the agglomerated removal device, wherein the passing of the purge gas is carried out while the agglomerate removal device is isolated from fluid flow communication with the regenerator and the receiver.

In yet another embodiment of the present invention, there is provided an agglomerate removal device comprising a first inlet, a first outlet, a second outlet, an agglomerate capture device, and an agglomerate withdrawal device. The agglomerate removal device defines a first flow path between the first inlet and first outlet and a second flow path between the first inlet and the second outlet. The first flow path comprises a first normally upstream portion and a first normally downstream portion, while the second flow path comprises a second normally upstream portion and a second normally downstream portion, and at least a portion of the first normally upstream portion of the first flow path overlaps at least a portion of the second normally upstream portion of the second flow path. The agglomerate capture device is disposed in the first normally downstream portion of the first flow path and comprises an agglomerate capture surface defining a first side and a second side. The agglomerate capture surface is shiftable between a first position where the first side is disposed the first normally downstream portion of the first flow path and a second position where the second side is disposed in the first normally downstream portion of the first flow path. The agglomerate withdrawal device is disposed in the second normally downstream portion of the second flow path and comprises a flow control device.

In a further embodiment of the present invention, there is provided a desulfurization system comprising a fluidized bed regenerator, a receiving vessel, and a solids transport system operable to transport a solids-containing stream from the fluidized bed regenerator to the receiving vessel. The fluidized bed regenerator defines a regenerator outlet, the receiving vessel defines a receiving inlet, and the solids transport system comprises an agglomerate removal device and an isolation system. The agglomerate removal device comprises a sorbent inlet, a sorbent outlet, and an agglomerate outlet. The agglomerate removal device defines a first flow path between the sorbent inlet and the sorbent outlet and a second flow path between the sorbent inlet and the agglomerate outlet. At least a portion of the first and second flow paths overlap. The isolation system comprises a first isolation device fluidly disposed between the regenerator outlet and the sorbent inlet of the agglomerate removal device and a second isolation device fluidly disposed between the sorbent outlet of the agglomerate removal device and the receiving inlet.

BRIEF DESCRIPTION OF THE FIGURES

Certain embodiments of the present invention are described in detail below with reference to the enclosed figures, in which like reference numerals are used to indicate like parts in the various views, wherein.

DETAILED DESCRIPTION

Figure 1:
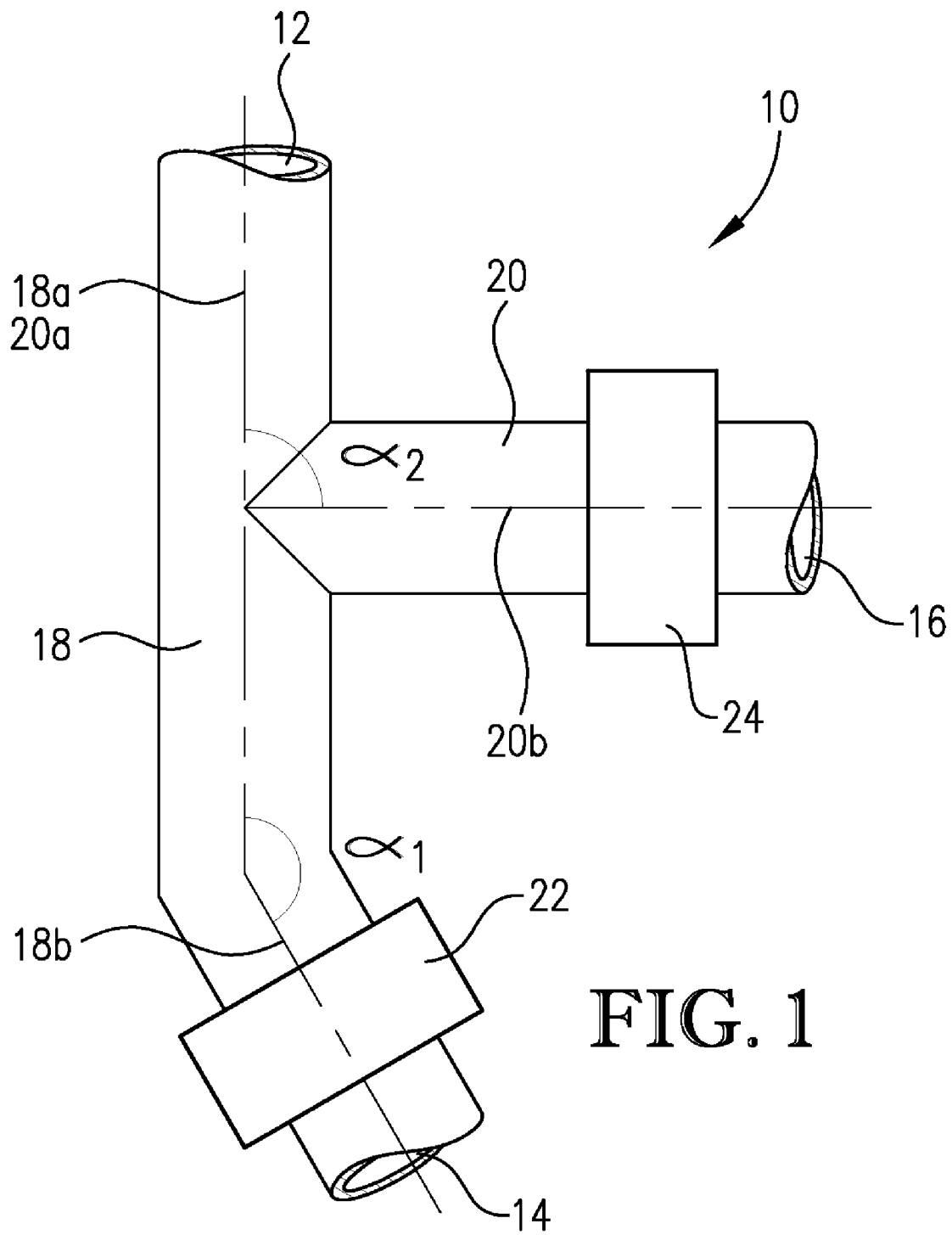
FIG. 1 is a simplified schematic diagram of an agglomerate removal device according to one embodiment of the present invention.

Referring now to FIG. 1, an agglomerate removal device 10 configured according to one embodiment of the present invention is illustrated as generally comprising a first inlet 12, a first outlet 14, and a second outlet 16. A first flow path 18 is generally defined between first inlet 12 and first outlet 14, while a second flow path 20 is generally defined between first inlet 12 and second outlet 16. First and second flow paths 18, 20 each comprise respective normally upstream portions 18a, 20a and respective normally downstream portions 18b, 20b. In one embodiment, at least a portion of normally upstream portion 18a of first flow path 18 can overlap at least a portion of normally upstream portion 20a of second flow path 20, as shown in FIG. 1.

In general, the normally upstream and downstream portions 18a,b of first flow path 18 can be oriented from each other by a first angle, $\alpha_1$. In one embodiment, $\alpha_1$ can be in the range of from about 105° to about 255°, about 120° to about 240°, about 135° to about 225°, about 150° to about 210°, or 165° to 195°. In another embodiment, normally upstream portion 18a of first flow path 18 can be aligned substantially in line with normally downstream portion 18b (i.e., $\alpha_1$ can be about 180°). Similarly, normally upstream and downstream portions 20a,b of second flow path can be oriented from each other by a second angle, $\alpha_2$. In one embodiment, $\alpha_2$ can be in the range of from about 5° to about 175°, about 15° to about 165°, about 30° to about 150°, about 45° to about 135°, about 60° to about 120°, or 75° to 105°. In another embodiment, normally upstream portion 20a of second flow path 20 can be aligned perpendicularly from downstream portion 20b (i.e., $\alpha_2$ can be about 90°).

As shown in FIG. 1, agglomerate removal device 10 can further comprise an agglomerate capture device 22 and an agglomerate withdrawal device 24. Typically, agglomerate capture device can be disposed in first flow path 18, while agglomerate withdrawal device can be disposed in second flow path 20. In one embodiment depicted in FIG. 1, agglomerate capture device 22 can be disposed in first normally downstream portion 18b of first flow path 18, while agglomerate withdrawal device 24 can be disposed in second normally downstream portion 20b of second flow path 20.

In one embodiment, agglomerate removal device 10 can be configured to permit individual solid particles therethrough, while trapping agglomerated particles therein. Generally, the solid particles passing through agglomerate removal device 10 can have an average particle size in the range of from about 0.5 micrometers (microns) to about 700 microns, about 1 micron to about 500 microns, or about 10 microns to about 300 microns. Typically, the agglomerates, which can be formed from two or more solid particles that have been fused together, can have an average particle size that is at least about 1.1 times, at least about 1.25 times, at least about 1.5 times, or at least about 2 times, or at least 2.5 times greater than the average particle size of the solid particles. In one embodiment, the agglomerates trapped within agglomerate removal device 10 can have an average particle size in the range of from about 1 to about 2,000 microns (2 millimeters), about 5 to about 1,500 microns (1.5 mm), or 20 to 1,000 microns (1 mm).

Several embodiments of specific configurations of agglomerate removal device 10 including agglomerate capture and withdrawal devices 22, 24 will now be described in greater detail with respect to FIGS. 2 and 3a-d.

Figure 2:
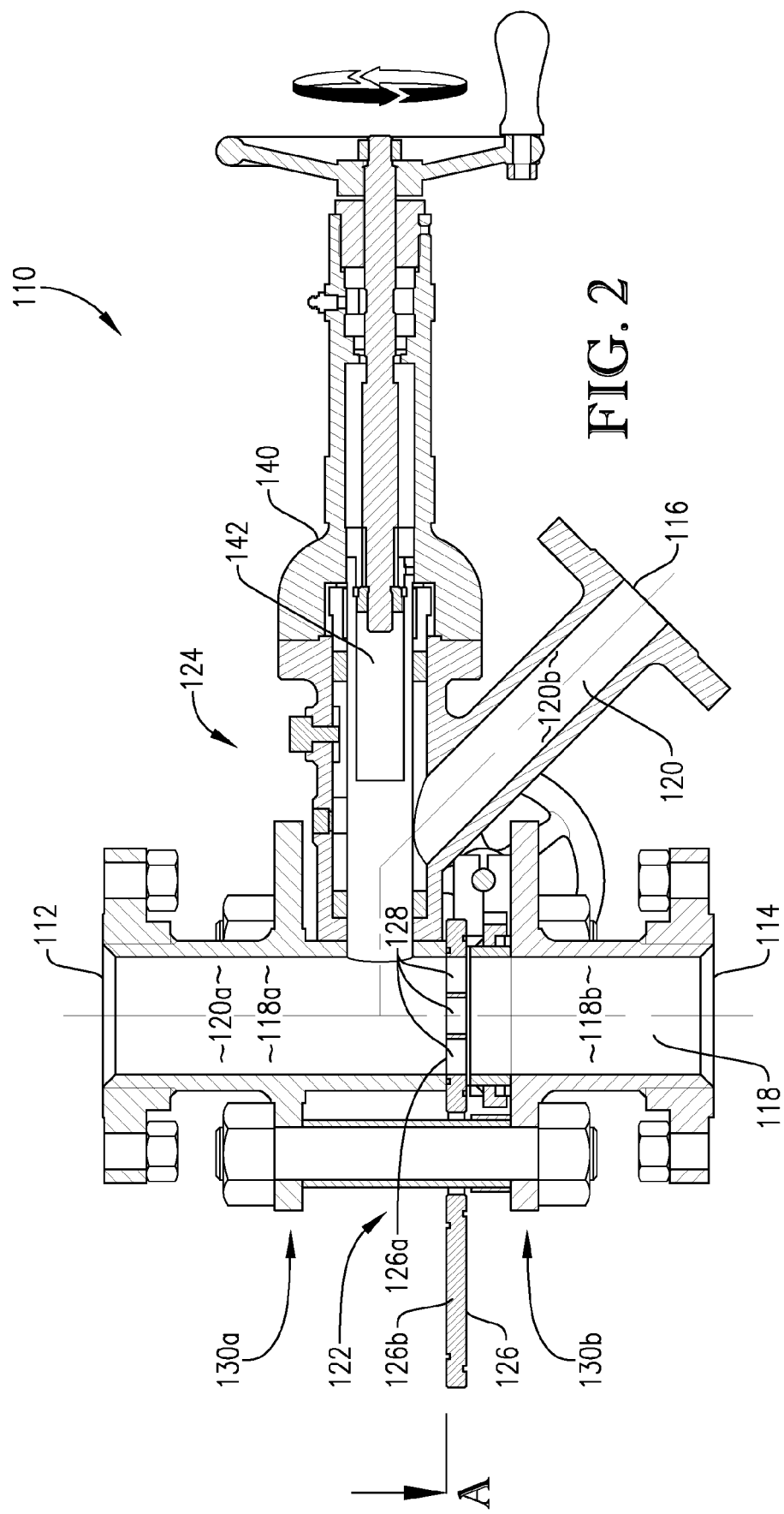
FIG. 2 is a cross-sectional view of an agglomerate removal device according to one embodiment of the present invention.

Referring now to FIG. 2, a specific configuration of an agglomerate removal device 110 in accordance with one embodiment of the present invention is presented. Similarly to agglomerate removal device 10 described previously with respect to FIG. 1, agglomerate removal device 110 depicted in FIG. 2 comprises a first inlet 112, a first outlet 114, and a second outlet 116 and defines first and second flow paths 118, 120. In addition, agglomerate removal device 110 includes an agglomerate capture device 122 at least partially disposed in first flow path 118 and an agglomerate withdrawal device 124 at least partially disposed in second flow path 120.

In one embodiment of the present invention, agglomerate removal device 110 can be a single, continuous unit, as illustrated in FIG. 2. In another embodiment, agglomerate capture device 122 and agglomerate withdrawal device 124 can be separate, removable units that are physically coupled together to form agglomerate removal device 110. According to one embodiment, agglomerate capture device 122 and/or agglomerate withdrawal device 124 can comprise one or more commercially available valves, such as, for example, those available from Strahman Valves, Inc. (Bethlehem, Pa., U.S.A.) or Fetterolf Corporation (Skippak, Pa., U.S.A.). Typically, agglomerate removal device 110 can be oriented substantially horizontally, substantially vertically, or in any manner therebetween. When agglomerate capture device is oriented in a substantially vertical direction, agglomerate capture device 122 can be located at a lower vertical elevation than agglomerate withdrawal device 124.

As shown in FIG. 2, agglomerate capture device 122 can comprise an agglomerate capture surface 126, which can generally define a first side 126a and a second side 126b. Typically, first side 126a can comprise a plurality of apertures 128, while second side 126b can define a substantially open surface (i.e., a single aperture) or a substantially continuous surface (i.e., no apertures). In one embodiment, at least a portion of apertures 128 defined on first side 126a of agglomerate capture surface 126 can have a maximum dimension (e.g., diameter for generally circular apertures) in the range of from about 0.25 mm to about 5 mm, about 0.5 mm to about 2.5 mm, or 0.75 to 2 mm. The sides 126a,b can be of any shape or size and can have a total surface area that is at least about 85 percent, at least about 90 percent, at least about 95 percent, or at least 99 percent of the total flow area defined by first flow path 118.

In one embodiment, agglomerate capture surface 126 can be shiftable between a first position (i.e., position A) where first side 126a can be disposed in first flow path 118 and a second position (i.e., position B) where second side 126b can be disposed in first flow path 118. In general, to secure first side of agglomerate capture surface 126a in first flow path 118 (i.e., position A), as shown in FIG. 2, a closure device (not shown) of agglomerate capture device 122 can be brought into sealing physical contact with agglomerate capture surface 126. Valve packing is one example of a suitable closure device. Conversely, disconnecting the closure device from physical contact with agglomerate capture surface 126 allows agglomerate capture surface 126 to be shifted from position A to position B where second side 126b can be fluidly disposed in first flow path 118. Thereafter, the closure device can be brought into sealing physical contact with second side 126b of agglomerate capture surface 126, thereby securing agglomerate capture surface 126 in position B.

Figure 3B:
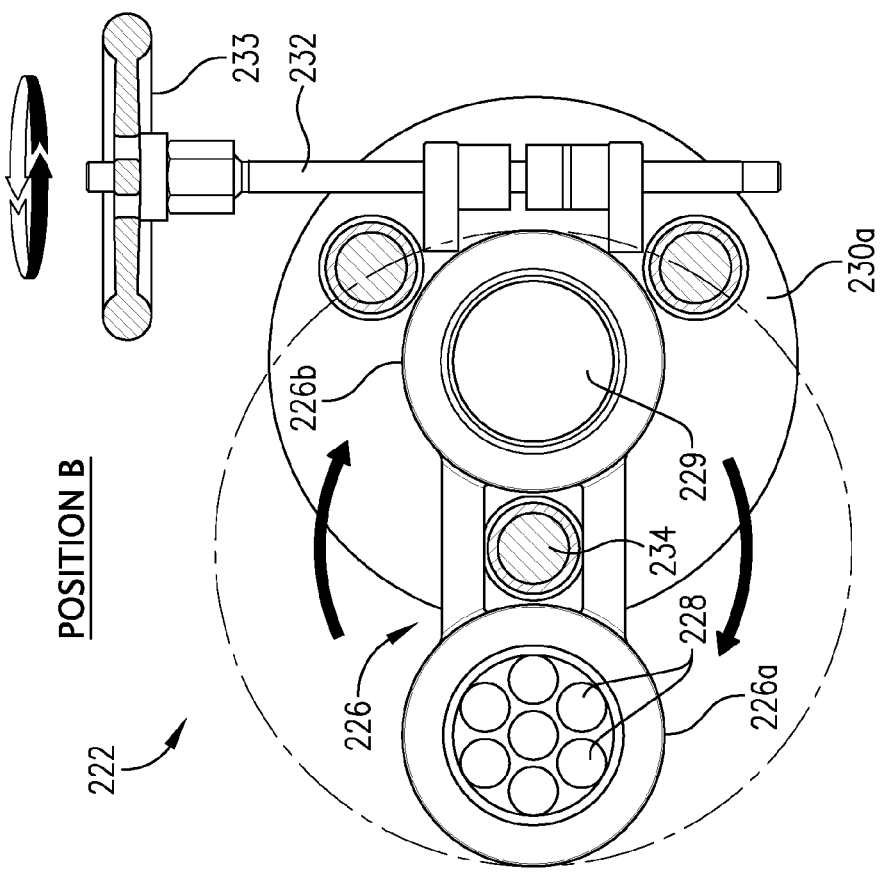
FIG. 3b is a top elevational view of the agglomerate removal device depicted in FIG. 3a configured in a second position according to one embodiment of the present invention.
Figure 3A:
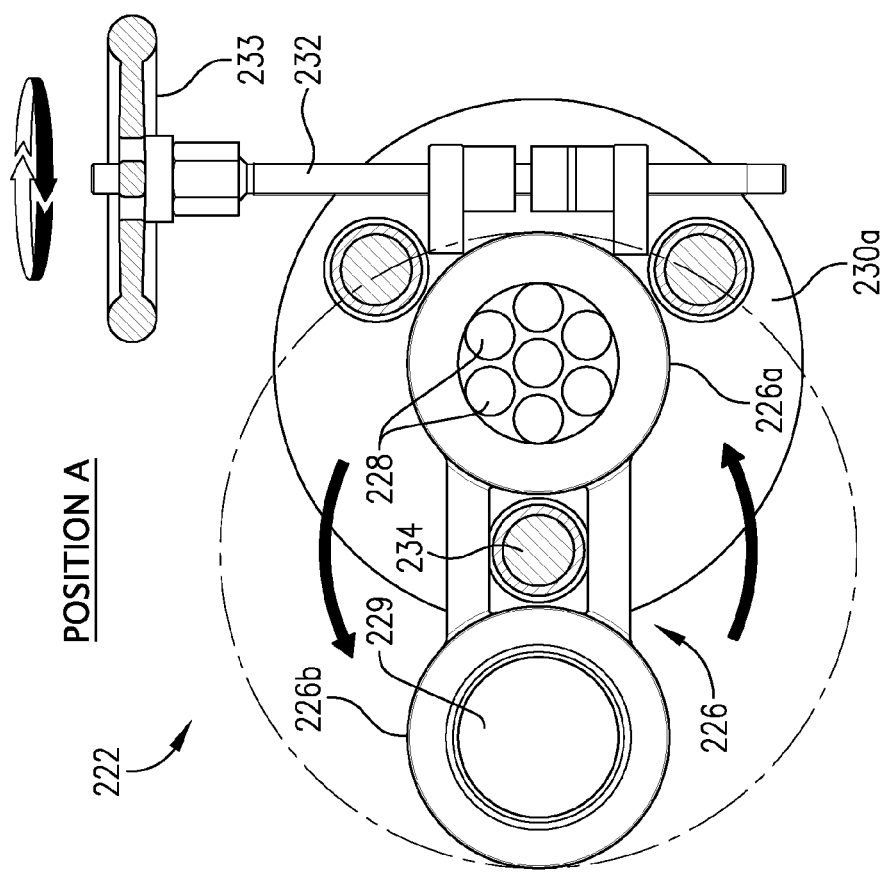
FIG. 3a is a top elevational view of an agglomerate removal device configured in a first position according to one embodiment of the present invention.
Figure 3C:
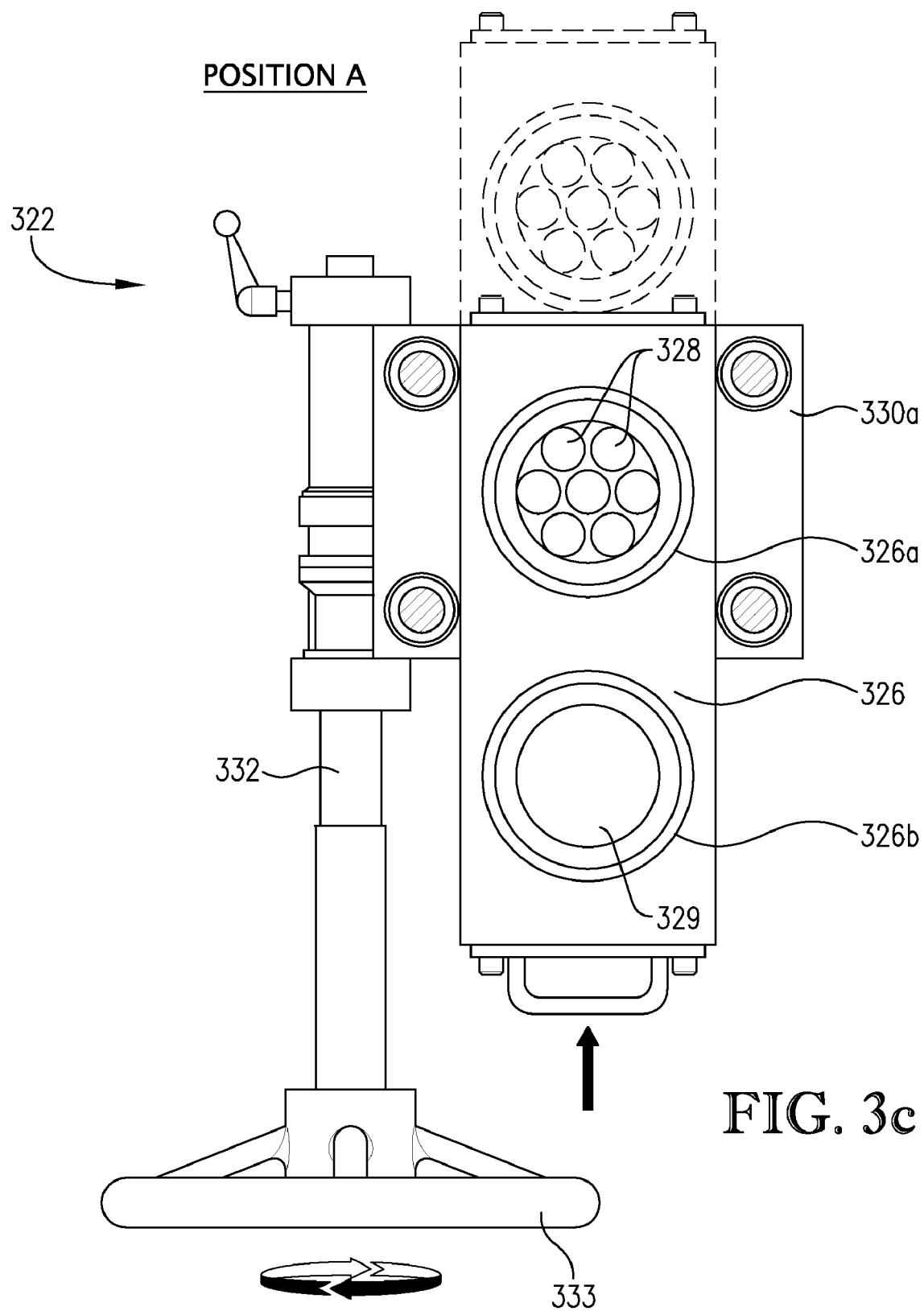
FIG. 3c is a top elevational view of an agglomerate removal device configured in a first position according to another embodiment of the present invention.
Figure 3D:
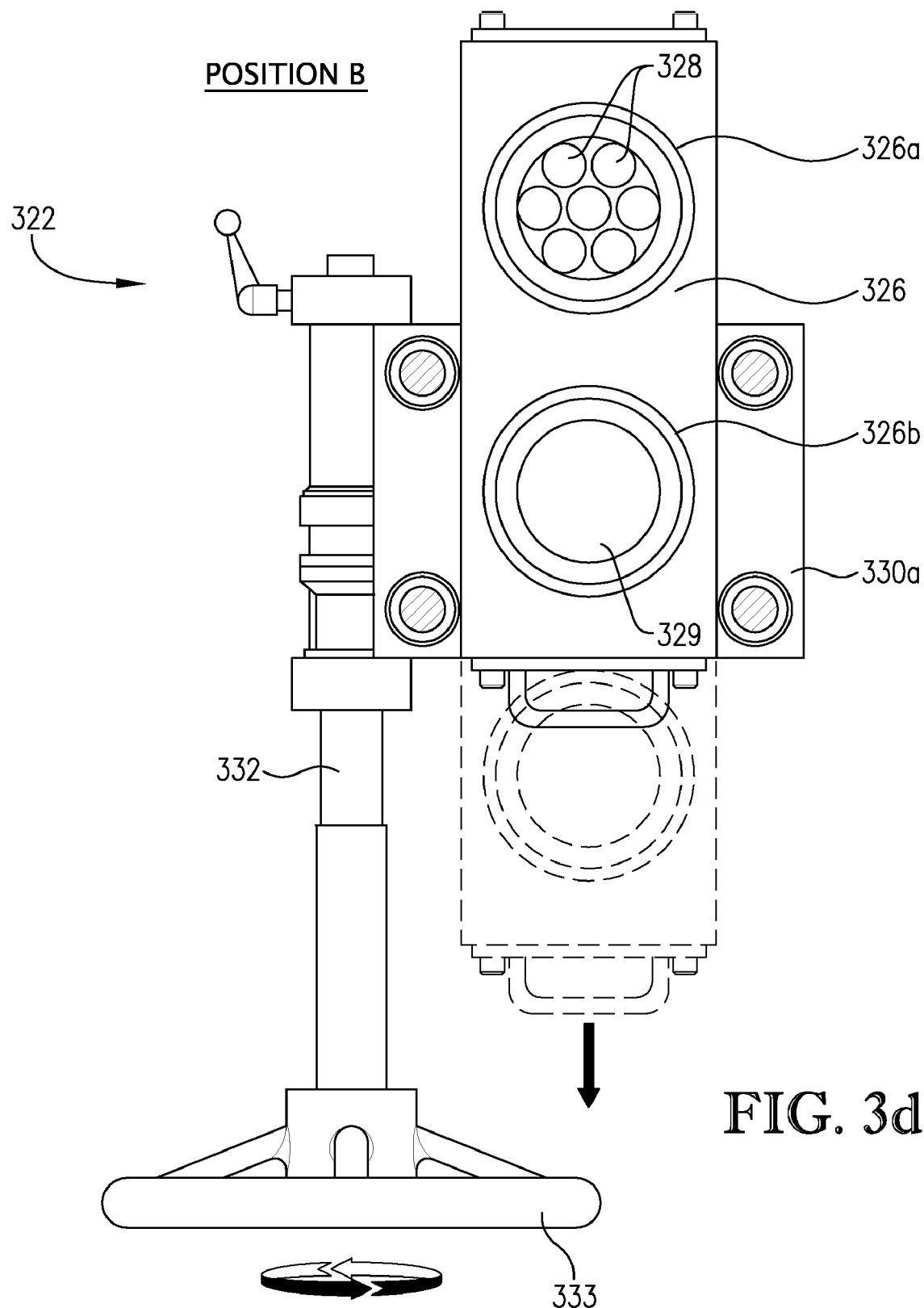
FIG. 3d is a top elevational view of the agglomerate removal device depicted in FIG. 3a configured in a second position according to another embodiment of the present invention.

In one embodiment, shifting agglomerate capture surface 126 from position A to position B can allow the apertures of first side 126a (if present) to be cleaned without disassembling agglomerate removal device 110 or physically decoupling agglomerate removal device 110 from the process equipment located upstream or downstream. Shifting agglomerate capture surface 126 between positions A and B can be accomplished in a number of ways. FIGS. 3a-d represent two specific embodiments of specific agglomerate capture devices employing exemplary mechanisms for shifting agglomerate capture surface 126 between positions A and B. In particular, FIGS. 3a and 3b depict an agglomerate capture device 222 employing a swing-type shifting mechanism, while FIGS. 3c and 3d illustrated an agglomerate capture device 322 employing a slide-type shifting mechanism.

Referring first to FIGS. 3a and 3b, one embodiment of agglomerate capture device 222 employing a swing-type shifting mechanism is illustrated. Similarly to agglomerate capture device 122 previously described with respect to FIG. 2, agglomerate capture device 222 shown in FIGS. 3a and 3b comprise an agglomerate capture surface 226 having a first side 226a that defines a plurality of apertures 228 and a second side 226b that defines a substantially open area 229. In addition, agglomerate capture device 222 comprises a closure device (not shown) operable to secure first 226a or second 226b side of agglomerate capture surface 226 in the flow path.

In one embodiment, the closure device can be tightened (i.e., brought into sealing physical contact with agglomerate capture surface 126) or loosened (i.e., disconnected from sealing physical contact with agglomerate capture surface 126) by moving tension bar 232 via a turning mechanism 233. Although illustrated in FIGS. 3a and 3b as a handwheel, turning mechanism 233 can comprise any device capable of rotating tension bar 232, such as, for example, a crank, a lever, or other similar device. Once the closure device has been loosened, agglomerate capture surface 226 can be shifted between position A (FIG. 3a) and position B (FIG. 3b) in a swing-type motion by rotating first and second sides 226a,b of agglomerate capture surface 226 in a generally circular path about a central pivot point (e.g., a bolt 234) as illustrated in FIG. 3a. Once second side 226b of agglomerate capture surface 226 is disposed in the flow path, the closure device can be tightened by adjusting turning mechanism 233 in the opposite direction, as shown in FIG. 3b. Shifting agglomerate capture surface 226 from position B to position A can be accomplished in a conversely analogous manner.

Turning now to FIGS. 3c and 3d, one embodiment of an agglomerate capture device 322 employing a slide-type shifting mechanism is illustrated as generally comprising an agglomerate capture surface 326 having a first side 326a and a second side 326b. Similarly to agglomerate capture surface 226 discussed previously with respect to FIGS. 3a and 3b, first side 326a of agglomerate capture surface 326 illustrated in FIGS. 3c and 3d comprises a plurality of apertures 328, while second side 326b of agglomerate capture surface 326b comprises a substantially open area 329.

Shifting agglomerate capture surface 326 of slide-type agglomerate capture device 322 from position A (FIG. 3c) to position B (FIG. 3d) can be carried out in a similar manner as previously described with respect to FIGS. 3a and 3b. In general, tension bar 332 of agglomerate capture device 322 can be rotated via turning mechanism 333 to break the physical contact between a closure device (not shown) and agglomerate capture surface 326. Thereafter, agglomerate capture surface 326 can be shifted via a sliding motion from position A to position B as illustrated in FIG. 3c. Once second side 326b of agglomerate capture surface is positioned in the flow path, as illustrated in FIG. 3d, the closing device can be tightened via tension bar 332 and turning mechanism 333. In order to shift agglomerate capture surface 326 from position B to back to position A, the same procedure can be followed, except agglomerate capture surface 326b can slide in the opposite direction in order to maneuver first side 326a into the flow path, as illustrated in FIG. 3d.

Referring back to FIG. 2, one embodiment of agglomerate withdrawal device 124 is illustrated as comprising a flow control device 140 operable to regulate fluid flow communication between normally upstream and normally downstream portions 120a,b of second flow path 120. Examples of suitable flow control devices 140 can include, but are not limited to, butterfly valves, globe valves, gate valves, disc valves, ram valves, and piston-type valves. According to one embodiment depicted in FIG. 2, flow control device 140 can comprise a piston-type valve that comprises a retractable piston 142 and second outlet 116. In one embodiment, retractable piston 142 can be shiftable between a first piston position where normally upstream and normally downstream portions 120a,b of second flow path 120 are in fluid flow communication with each other (i.e., position C), as shown in FIG. 2, and a second piston position (i.e., position D, not shown) where normally upstream and normally downstream portions 120a,b of second flow path 120 are substantially isolated from fluid flow communication with each other by piston 142. When retractable piston 142 is in position C, second outlet 116 (optionally referred to as agglomerate outlet 116) can be in fluid flow communication with first flow path 118, while position D substantially isolates agglomerate outlet 116 from fluid flow communication with first flow path 118.

Figure 4:
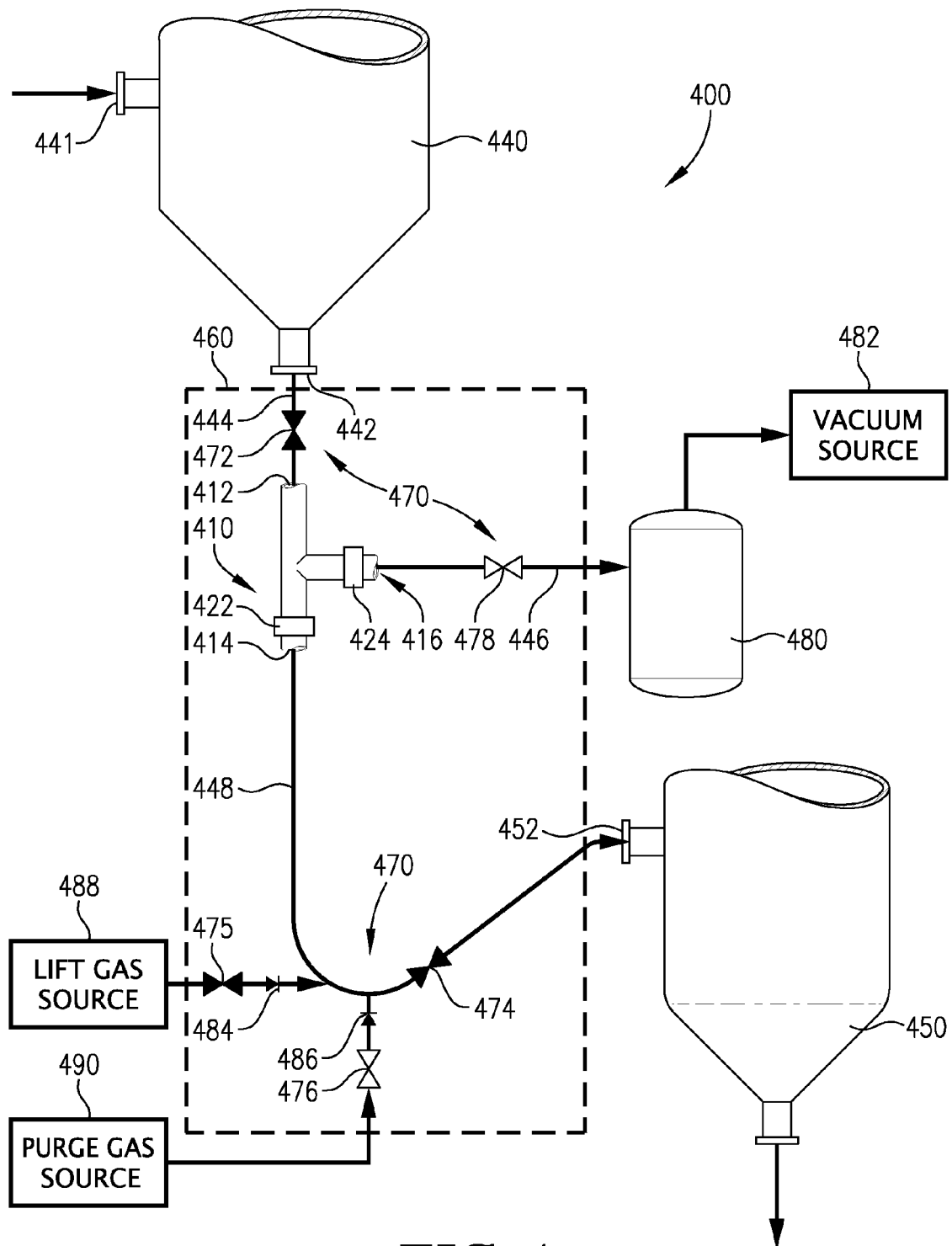
FIG. 4 is a schematic diagram of a particle system employing an agglomerate removal device according to one embodiment of the present invention.

Turning now to FIG. 4, one embodiment of a particle system 400 employing an agglomerate removal device 410, similar to the agglomerate removal device 10 previously described with respect to FIG. 1, is illustrated. Particle system 400 can be any system operable to circulate a plurality of solid sorbent and/or catalyst particles therethrough. In one embodiment, described in further detail shortly with respect to FIG. 6, particle system 400 can comprise a desulfurization system. In general, the main components of the particle system 400 illustrated in FIG. 4 include a first vessel 440, a second vessel 450, and a solids transport system 460 operable to transport a solids-containing process stream first and second vessels 440, 450. As shown in FIG. 4, solids transport system 460 generally includes agglomerate removal device 410 and an isolation system 470, which will be described in detail below.

First and/or second vessels 440, 450 can be any vessels from which solid catalyst and/or sorbent particles can be added or withdrawn in a batch, semi-batch, semi-continuous, or continuous manner. In general, first and/or second vessels 440, 450 can comprise a fluidized particle bed (i.e., a fluidized bed vessel), a fixed particle bed (i.e., a fixed bed vessel), or any combination thereof (i.e., a hybrid vessel). Typically, first and/or second vessels 440, 450 vessel 440 can comprise a reaction vessel (i.e., a reactor), a regeneration vessel (i.e., a regenerator), a reduction vessel (i.e., a reducer), or any other type of process or storage vessel.

First vessel 440 comprises a first inlet 441 operable to receive a particle-containing stream and an outlet 442 operable to discharge a particle-containing stream. As illustrated in FIG. 4, outlet 442 of first vessel 440 can be coupled in fluid flow communication with a first inlet 412 of agglomeration removal device 410 via conduit 444. Agglomeration removal device 410 generally comprises an agglomeration capture device 422 and an agglomeration withdrawal device 424 and can be configured according to one or more embodiments previously discussed with respect to FIGS. 1, 2, and 3a-d. Referring back to FIG. 4, a second outlet 416 of agglomeration removal device 410 can be coupled in fluid flow communication via conduit 446 with an agglomerate collection vessel 480, which can optionally be fluidly coupled to a vacuum source 482.

As shown in FIG. 4, first outlet 414 of agglomeration device 410 can be coupled in fluid flow communication with an inlet 452 of second vessel 450 via conduit 448. In one embodiment, conduit 448 can additionally include a lift gas inlet 484 and a purge gas inlet 486 for respectively receiving streams of gas from a lift gas source 488 and/or purge gas source 490. In one embodiment, purge gas source 490 and lift gas source 488 can be distinct units or vessels. In another embodiment, purge gas source 490 and lift gas source 488 can be the same unit or vessel.

Referring again to FIG. 4, isolation system 470 is illustrated as comprising the following isolation devices: (1) a first vessel isolation device 472 fluidly disposed between first vessel 440 and agglomeration removal device 410; (2) a second vessel isolation device 474 fluidly disposed between agglomeration removal device 410 and second vessel 460; (3) a lift gas isolation device 475 fluidly disposed between lift gas source 488 and lift gas inlet 484; (4) a purge gas isolation device 476 fluidly disposed between purge gas source 490 and purge gas inlet 486; and (5) a collection vessel isolation device 478 fluidly disposed between agglomeration removal device 410 and agglomerate collection vessel 480. Examples of isolation devices can include, but are not limited to any type of isolation or line blinding valve. In general, isolation devices 472, 474, 475, 476, and 478 can be manually and/or automatically controlled.

Particle system 400 can generally be operated in two distinct modes: a primary mode where at least a portion of the agglomerated solid particles in the solids-containing stream passed from first vessel 440 to second vessel 450 are trapped and retained in agglomerate capture device 422 and a secondary mode where at least a portion of the separated or trapped agglomerates are discharged from the system via agglomerate withdrawal device 424. The primary and secondary modes of operation of particle system 400 illustrated in FIG. 4 will now be described in more detail with respect to the flow chart provided in FIG. 5 and the valve position summary represented in Table 1 below.

TABLE 1

Valve Position Summary

| Isolation Device (FIG. 4) | Reference Numeral | Block (FIG. 5) | | | |
|---|---|---|---|---|---|
| | | 502 | 504 | 506 | 508 |
| First Vessel | 472 | O | C | C | C |
| Second Vessel | 474 | O | C | C | C |
| Lift Gas Source | 475 | O | C | C | C |
| Purge Gas Source | 476 | C | O | C | C |
| Collection Vessel | 478 | C | O | C | C |

Valve Positions: Open (O) or Closed (C)

Figure 5:
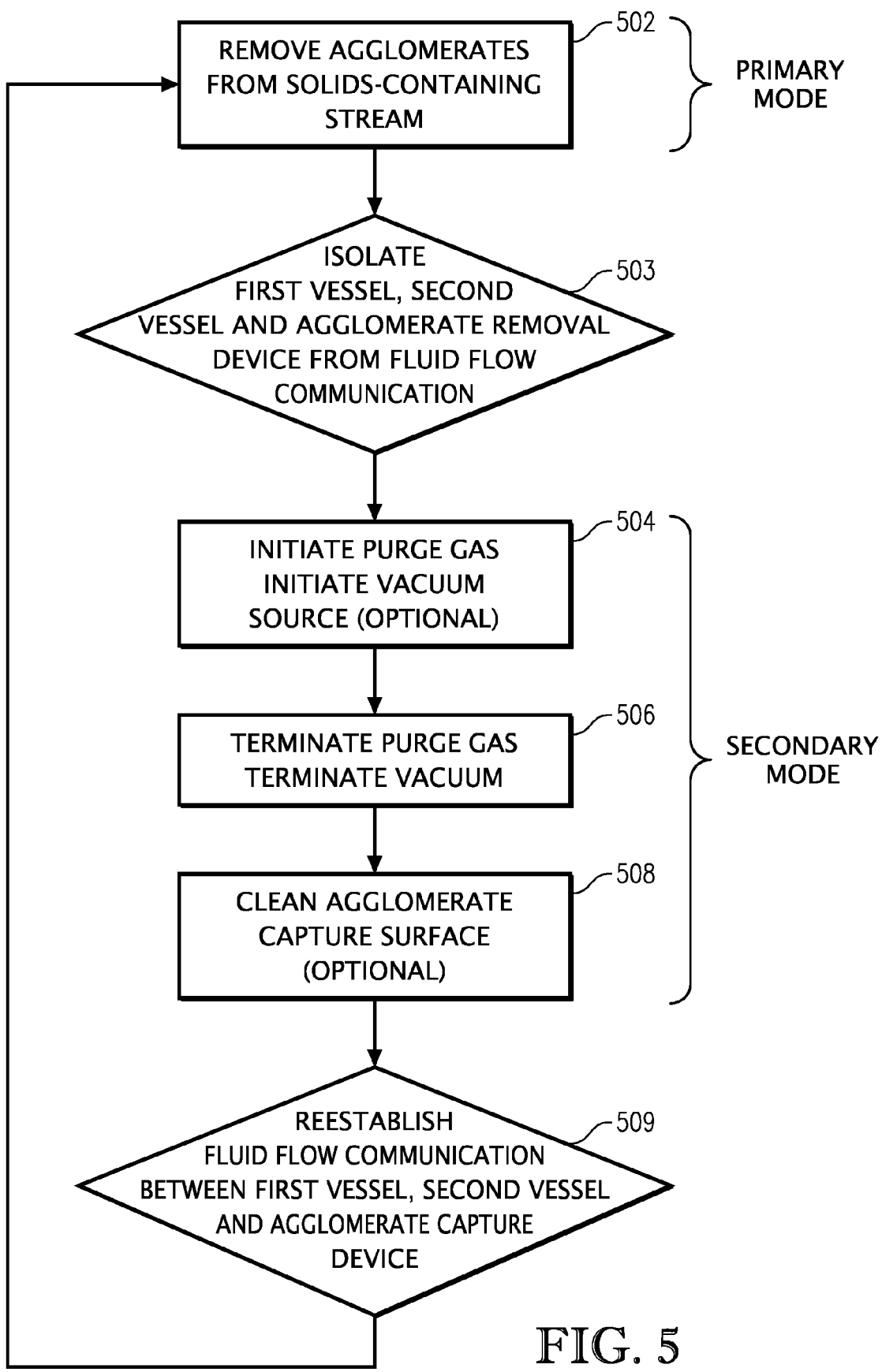
FIG. 5 is a flowchart of steps involved in the operation of the particle system depicted in FIG. 4.

In particular, FIG. 5 outlines the major steps involved in operating particle system 400 illustrated in FIG. 4 during both the primary and secondary modes of operation, while Table 1 summarizes the positions of each of the isolation devices shown in FIG. 4 during key steps of each operational mode. In one embodiment of the present invention, each of the steps illustrated in FIG. 5 can be carried out without physically decoupling solids transport system 460 from first or second vessel 440, 450. In another embodiment, none of the steps 502 through 508 depicted in FIG. 5 require physically decoupling agglomerate removal device 410 from first or second vessel 440, 450.

During the primary mode of operation, represented by block 502 in FIG. 5, a solids-containing stream withdrawn from outlet 442 of first vessel 440 can be transported to agglomerate removal device 410 via conduit 444, as shown in FIG. 4. The portion of agglomerate capture surface 426 (e.g., first side 426a) of agglomerate capture device 422 can trap at least a portion of the agglomerates in the solids-containing stream to thereby provide a plurality of separated or trapped agglomerates and an agglomerate-depleted stream, which can be passed via conduit 448 to second vessel 450. In one embodiment, agglomerate removal device 410 can remove substantially all of the agglomerates from the solids-containing stream in conduit 444, while removing substantially none of the solid particles from the solids-containing stream in conduit 444. For example, in one embodiment, agglomerate removal device 410 can have an agglomerate removal efficiency of at least about 65 percent, at least about 75 percent, at least about 85 percent, or at least 95 percent and a particle removal efficiency of less than about 5 percent, less than about 3 percent, less than about 2 percent, less than 1 percent. The agglomerate removal efficiency of agglomerate removal device 410 can be defined according to the following formula: (mass of agglomerates entering agglomerate removal device 410 in conduit 444−mass of agglomerates exiting agglomerate removal device 410 in conduit 448)/(mass of agglomerates entering agglomerate removal device 410 in conduit 444), expressed as a percentage. Similarly, the particle removal efficiency of agglomerate removal device 410 can be defined according to the following formula: (mass of particles entering agglomerate removal device 410 in conduit 444−mass of particles exiting agglomerate removal device 410 in conduit 448)/(mass of particles entering agglomerate removal device 410 in conduit 444), expressed as a percentage.

As shown in Table 1, first vessel isolation device 472 and second vessel isolation device 450 can be open during the primary mode of operation. Additionally, lift gas source isolation device 475 can be open to thereby allow a pressurized stream of lift gas (e.g., nitrogen) to be introduced into conduit 448 to fluidize the particles therein and facilitate the transfer of the agglomerate-depleted, solid-particle containing stream into second vessel 450. Typically, a lift gas stream can be used when solid-particle stream changes flow direction, such as, for example, if the conduit connecting the first and second vessels 440,450 changes its physical orientation from substantially vertical to substantially horizontal, as generally depicted in FIG. 4. According to Table 1, both purge gas source isolation device and collection vessel isolation device can be closed during the primary mode of operation, thereby isolating purge gas source 490 and collection vessel 480 from fluid flow communication with solid transport system 460.

Once the system depicted in FIG. 4 has operated for some time, the system can then transition into the secondary mode of operation, which is represented by blocks 504 through 508 in FIG. 5. As shown by block 503 in FIG. 5, transitioning includes first discontinuing the flow of the solids-containing stream transported between first and second vessels 440, 450 and the flow of the lift gas stream injected into solid transfer system 460 by isolating first vessel 400, second vessel 450, and agglomerate removal device 410 from fluid flow communication with each other. As shown in Table 1, this can include closing isolation devices 472, 474, and 475, respectively. Next, particle system 400 can enter the secondary mode of operation by deisolating purge gas source 490 and collection vessel 480 from fluid flow communication with particle transport system 460 by opening isolation devices 475 and 478, as shown in Table 1.

During the secondary mode of operation, a purge gas stream originating from purge gas source 490 can be introduced into conduit 448, as shown by block 504 in FIG. 5, and can pass upwardly through agglomerate removal device 410. As shown in Table 1, this requires purge gas source isolation device 475 and collection vessel isolation device 478 to be open. As the purge stream, which flows in a generally opposite direction of the solids-containing stream, passes upwardly through the agglomerate capture surface (not shown) of agglomerate capture device 422, at least a portion of the separated agglomerates trapped thereon can become fluidized and can subsequently exit agglomerate removal device 410 via agglomerate outlet 416 of agglomerate withdrawal device 424. Thereafter, the withdrawn agglomerates can be routed into collection vessel 480, as shown in FIG. 4. Optionally, collection vessel 480 can comprise a vacuum source 482, which can help facilitate the withdrawal of agglomerates from agglomerate removal device 410 by increasing the pressure drop (i.e., motive force) between purge gas source 490 and agglomerate outlet 416.

Once most of the trapped agglomerates have been removed from agglomerate capture surface (not shown), the flow of the purge gas stream and, if applicable, the vacuum created by vacuum source 482 can be terminated, as represented by block 506 in FIG. 5. As shown in Table 1, purge gas source isolation device 475 and collection vessel isolation device 478 can be closed to re-isolate purge gas source 490 and collection vessel 480. Optionally, prior to returning particle system 400 back into the primary mode of operation, at least a portion of agglomerate capture surface (not shown) of agglomerate capture device 422 can be manually cleaned, as represented by block 508 in FIG. 5. In contrast to conventional agglomerate removal devices, in one embodiment of the present invention, the agglomerate capture surface of agglomerate capture device 422 can be cleaned without physically decoupling agglomerate removal device 410 from first or second vessel 440, 450. Specific embodiments of agglomerate capture and removal devices were discussed in detail previously with respect to FIGS. 2 and 3a-d.

Turning back to FIGS. 4 and 5, particle system 400 illustrated in FIG. 4 can thereafter be returned to the primary mode of operation by reestablishing fluid flow communication between first and second vessels 440 and 450, as shown by block 509 in FIG. 5 by opening first and second vessel isolation devices 472 and 474. Next, lift gas can be reintroduced into the system by opening isolation valve 475, as shown in Table 1, and lift gas isolation device 475, as shown in Table 1. Thereafter, the particle system in FIG. 4 can return to the primary mode of operation, as represented by block 502 in FIG. 5.

Figure 6:
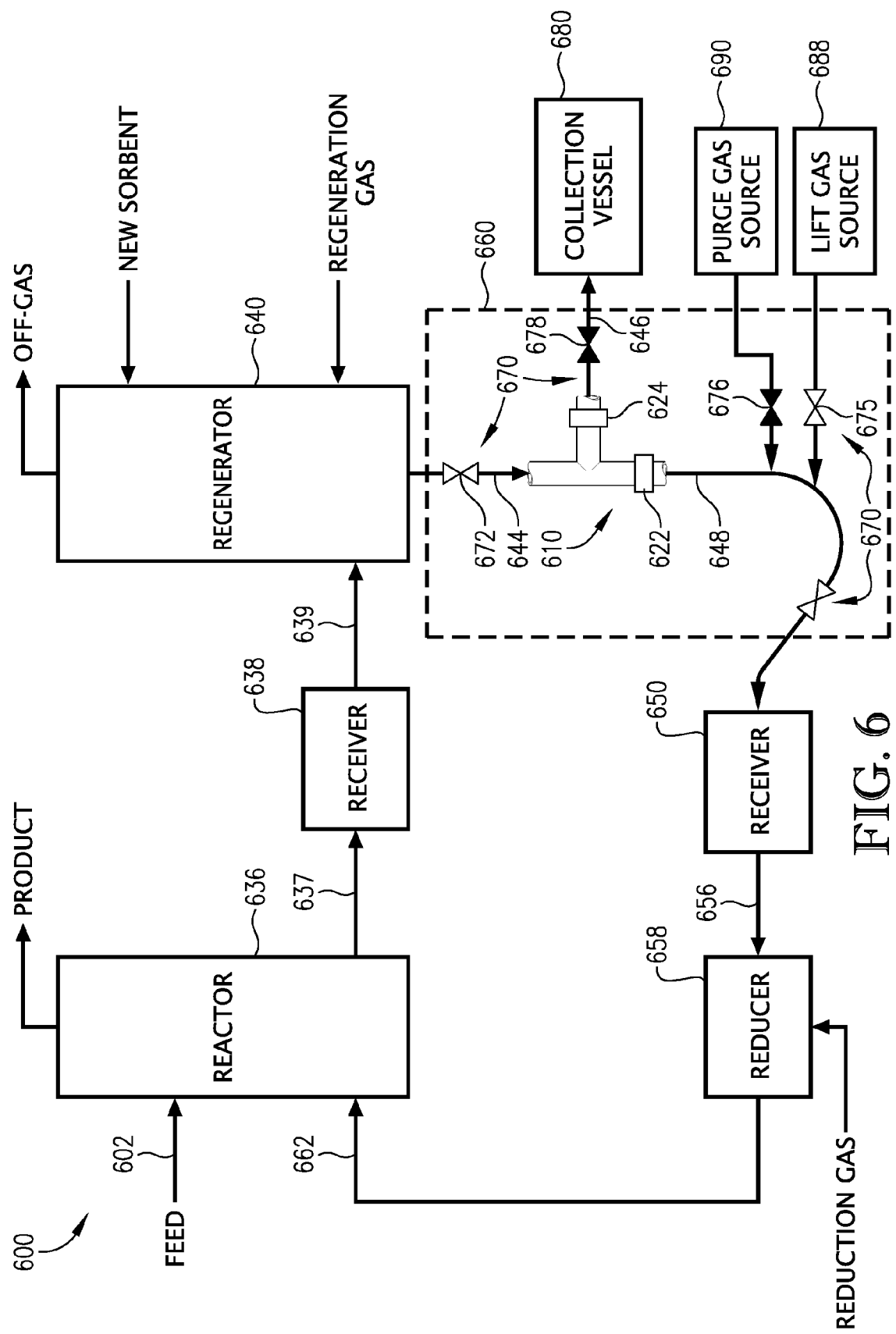
FIG. 6 is a schematic diagram of a desulfurization system employing an agglomerate removal device according to one embodiment of the present invention.

Referring now to FIG. 6, one embodiment of a desulfurization process employing an agglomerate removal device is illustrated as generally comprising a fluidized bed reactor 636, a first receiver 638, a fluidized bed regenerator 640, a second receiver 650, a fluidized bed reducer 656, and a sorbent transfer system 660. Similarly to sorbent transfer system 460 of particle system 400 previously described with respect to FIG. 4, sorbent transfer system 660 comprises an agglomerate removal device 610 and an isolation system 670.

As shown in FIG. 6, a sulfur-containing hydrocarbon feed stream in conduit 602 can be introduced into fluidized bed reactor 636, wherein the stream can be desulfurized under desulfurization conditions via contact with a plurality of solid sorbent particles. In one embodiment of the present invention, the sulfur-containing feed stream in conduit 602 can comprise gasoline, diesel, or a combination thereof. Gasoline typically comprises a mixture of hydrocarbons having a boiling point in the range of from about 35° C. (95° F.) to about 260° C. (500° F.). In general, gasolines comprise in the range of from about 5 to about 50 weight percent, about 10 to about 35 weight percent, or 15 to 25 weight percent of olefins and/or in about 10 to about 55, about 15 to about 45 weight percent, or 20 to 40 weight percent aromatics, based on the total weight of the gasoline stream. Examples of gasolines include, but are not limited to, naphthas such as straight-naphtha, coker naphtha, catalytic gasoline, visbreaker naphtha, alkylate, isomerate, and reformate and/or catalytically- or thermally-cracked gasolines such as coker gasoline, visbreaker gasoline, fluidized catalytic cracker (FCC) gasoline, heavy oil cracker (HOC) gasoline, hydrocracker gasoline. Diesel fuel can generally be characterized as having a boiling point in the range of from about 150° C. (302° F.) to about 400° C. (752° F.), and generally comprises in the range of from about 10 to about 90 weight percent, about 20 to about 80 weight percent, or 15 to 60 weight percent aromatics and/or less than about 10 weight percent, less than about 5 weight percent, or substantially no olefins. Examples of diesel fuels can include, but are not limited to, light cycle oil, kerosene, jet fuel, straight-run diesel, hydrotreated diesel, and combinations thereof. In one embodiment, the gasoline and/or diesel fuel in conduit 602 may have previously been fractionated and/or hydrotreated in an upstream unit (not shown) prior to entering reactor 636.

In one embodiment of the present invention, the hydrocarbon feed stream can comprise one or more sulfur-containing compounds, which can include, but are not limited to, hydrogen sulfide ($H_2S$), carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkyl benzothiophenes, alkyl dibenzothiophenes, and combinations thereof. In general, R can be an alkyl, cycloalkyl, or aryl group comprising in the range of from about 1 to about 15 carbon atoms. In one embodiment, the feed stream in conduit 602 can have a sulfur content greater than about 50 parts per million by weight (ppmw), or in the range of from about 100 to about 10,000 ppmw, about 150 to about 5,000 ppmw, based on the total weight of the stream. Sulfur content refers to the amount of atomic sulfur in the sulfur-containing compounds and can be determined according to various ASTM standard methods, including, for example, ASTM D 2622 *Standard Test Method for Sulfur in Petroleum Products by Wavelength Dispersive X-ray Fluorescence Spectrometry* or ASTM D 5453 *Standard Test Method for Determination of Total Sulfur in Light Hydrocarbons, Spark Ignition Engine Fuel, Diesel Engine Fuel, and Engine Oil by Ultraviolet Fluorescence*. In another embodiment, at least about 50 weight percent, at least about 75 weight percent, or at least about 90 weight percent of the total mass of atomic sulfur in the sulfur-containing feed stream in conduit 602 can comprise organosulfur compounds.

The solid sorbent particles contacted with the sulfur-containing fluid stream in reactor 636 can be any sufficiently fluidizable, circulatable, and regenerable zinc-oxide based composition having sufficient desulfurization activity and sufficient attrition resistance at the desulfurization conditions within reactor 636. In one embodiment, the sorbent particles employed in fluidized bed reactor 636 comprise zinc oxide and a promoter metal component. A description of such a sorbent composition and a method of its preparation are provided in U.S. Pat. Nos. 6,429,170 and 7,241,929, the entire disclosures of which are incorporated herein by reference to the extent not inconsistent with the present disclosure.

The promoter metal component can comprise a promoter metal selected from the group consisting of nickel, cobalt, iron, manganese, tungsten, silver, gold, copper, platinum, zinc, tin, ruthenium, molybdenum, antimony, vanadium, iridium, chromium, palladium, rhodium, and mixtures thereof. In one embodiment, at least a portion of the promoter metal component can comprise a reduced-valence promoter metal. As used herein, the term "reduced-valence" refers to a promoter metal having a valence that is less than the valence of the metal in its common oxidized state. For example, in one embodiment wherein the promoter metal comprises nickel, the reduced-valence promoter metal can have a valence less than 2 or zero. According to one embodiment, at least about 65 percent, at least about 75 percent, at least about 90 percent, or substantially all of the promoter component of the sorbent entering reactor 636 via conduit 662 and/or in the desulfurization zone of reactor 636 can comprise a reduced-valence promoter metal.

In one embodiment of the present invention, the reduced-valence promoter metal component comprises, consists of, or consists essentially of, a substitutional solid metal solution characterized by the formula: $M_A Zn_B$, wherein M is the promoter metal and A and B are each numerical values in the range of from about 0.01 to about 0.99. In the above formula for the substitutional solid metal solution, A can be in the range of from about 0.70 to about 0.98 or 0.85 to 0.95 and B can be in the range of from about 0.03 to about 0.30 or 0.05 to 0.15. In one embodiment, A+B=1.

Substitutional solid solutions are a subset of alloys that are formed by the direct substitution of the solute metal for the solvent metal atoms in the crystal structure. For example, it is believed that the substitutional solid metal solution $M_A Zn_B$ is formed by the solute zinc metal atoms substituting for the solvent promoter metal atoms. Three basic criteria exist that favor the formation of substitutional solid metal solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc (as the elemental metal or metal oxide) employed in the sorbent described herein typically meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92} Zn_{0.08}$) that is formed during reduction and microscopically in the repeated regenerability of sorbent.

In addition to zinc oxide and the reduced-valence promoter metal component, the solid sorbent particles employed in reactor 636 can further comprise a porosity enhancer and an aluminate. The aluminate can be a promoter metal-zinc aluminate substitutional solid solution. The promoter metal-zinc aluminate substitutional solid solution can be characterized by the formula: $M_Z Zn_{(1-Z)} Al_2 O_4$, where M is the promoter metal and Z is a numerical value in the range of from 0.01 to 0.99. The porosity enhancer, when employed, can be any compound which ultimately increases the macroporosity of the solid sorbent particles.

In one embodiment, the porosity enhancer can be perlite. The term "perlite" as used herein is the petrographic term for a siliceous volcanic rock which naturally occurs in certain regions throughout the world. The distinguishing feature, which sets it apart from other volcanic minerals, is its ability to expand four to twenty times its original volume when heated to certain temperatures. When heated above 870° C. (1,598° F.), crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot. Typical chemical analysis properties of expanded perlite are: silicon dioxide 73%, aluminum oxide 17%, potassium oxide 5%, sodium oxide 3%, calcium oxide 1%, plus trace elements. Typical physical properties of expanded perlite include: (1) softening point 870° C. (1,598° F.) to 1,095° C. (2,003° F.); (2) fusion point 1,260° C. (2,300° F.) to 1,343° C. (2,444° F.); (3) pH 6.6 to 6.8; and (4) specific gravity 2.2 to 2.4. The term "expanded perlite" as used herein refers to the spherical form of perlite which has been expanded by heating the perlite siliceous volcanic rock to a temperature above 870° C. (1,598° F.). The term "particulate expanded perlite" or "milled perlite" as used herein denotes that form of expanded perlite which has been subjected to crushing so as to form a particulate mass wherein the particle size of such mass is comprised of at least 97 percent of particles having a size of less than two microns. The term "milled expanded perlite" is intended to mean the product resulting from subjecting expanded perlite particles to milling or crushing.

Table 2, below, summarizes broad, intermediate, and narrow ranges for the amount of zinc oxide, reduced-valence promoter metal component ($M_A Zn_B$), porosity enhancer (PE), and promoter metal-zinc aluminate ($M_Z Zn_{(1-Z)} Al_2 O_4$) in the reduced sorbent composition employed in reactor 636 according to one embodiment of the present invention.

TABLE 2

| | Reduced Sorbent Composition (wt %) | | | |
|---|---|---|---|---|
| Range | ZnO | $M_A Zn_B$ | PE | $M_Z Zn_{(1-Z)} Al_2 O_4$ |
| Broad | 10-90 | 5-80 | 2-50 | 2-50 |
| Intermediate | 20-60 | 10-60 | 5-30 | 5-30 |
| Narrow | 30-40 | 30-40 | 10-20 | 10-20 |

The solid sorbent particles employed in desulfurization system 600 depicted in FIG. 6 can typically have a mean particle size in the range of from about 1 to about 500 micrometers (microns) or about 10 to about 300 microns, as determined by using a using a RO-TAP Testing Sieve-Shaker, manufactured by W. S. Tyler, Inc. of Mentor, Ohio, or other comparable sieves. To determine mean particle size, the material to be measured is placed in the top of a nest of standard 8 inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size, by the method outlined in Chapter 3 of Fluidization Engineering by Kunii and Levenspiel (1987). In one embodiment, the solid sorbent particles can be in the form of a microsphere.

Referring back to FIG. 6, the sulfur-containing hydrocarbon stream in conduit 602 can be introduced into fluidized bed reactor 636, wherein the stream can be contacted with a plurality of sorbent particles under desulfurization conditions to thereby desulfurize at least a portion thereof. In general, the desulfurization conditions employed in reactor 636 include a total pressure, temperature, and weight hour space velocity. In one embodiment, the temperature in reactor 626 can be in the range of from about 95° C. (203° F.) to about 815° C. (1499° F.), about 260° C. (500° F.) to about 480° C. (896° F.), or 315° C. (599° F.) to 455° C. (851° F.). The total pressure can be in the range of from about 205 kPa (29.7 psia) to about 10,450 kPa (1,515.6 psia), about 450 kPa (65.2 psia) to about 4,250 kPa (616 psia), or 795 kPa (115 psia) to 1,480 kPa (215 psia). Weight hourly space velocity (WHSV) measures the mass flow rate (kg/h) at standard temperature and pressure (STP) per kilogram of sorbent present in the desulfurization zone of reactor 636. In one embodiment, the WHSV in reactor 636 can be in the range of from about 0.5 h$^{-1}$ to about 50 h$^{-1}$ or about 1 h$^{-1}$ to about 20 h$^{-1}$.

Optionally, other reactants, either alone or in a diluent, can be introduced into reactor 636. For example, in one embodiment, an additional reactant stream comprising at least about 25 volume percent, at least about 50 percent, at least about 75 percent, or at least 90 percent hydrogen can be introduced into the desulfurization zone of reactor 636. In one embodiment, the hydrogen-containing stream can be introduced directly into reactor 636. In another embodiment, the hydrogen-containing stream can be combined with the sulfur-containing hydrocarbon feed stream in conduit 602 prior to entering reactor 636. In general, high purity hydrogen may not be required and diluents, such as, for example, methane, carbon dioxide, flue gas, nitrogen, and combinations thereof can additionally be present in the hydrogen-containing stream introduced into the desulfurization zone. The total amount of hydrogen introduced into reactor 636 can generally be such that the mole ratio of hydrogen to sulfur-containing fluid can be in the range of from about 0.01:1 to about 100:1, about 0.1:1 to about 10:1, or 0.2:1 to 2:1.

In one embodiment, the desulfurization conditions in reactor 636 can be sufficient to vaporize at least a portion of the sulfur-containing hydrocarbon stream introduced into reactor 636. In one embodiment, at least about 90 percent, at least about 95 percent, at least about 98 percent, or substantially all of the sulfur-containing hydrocarbon stream in conduit 602 can be in the vapor phase in the desulfurization zone of reactor 636.

When the sorbent composition is contacted with the sulfur-containing hydrocarbon fluid in the desulfurization zone, at least a portion of the sulfur compounds in the sulfur-containing stream can be removed therefrom. While not wishing to be bound by theory, it is believed that at least a portion of the sulfur removed from the sulfur-containing fluid can be employed to convert at least a portion of the zinc oxide of the sorbent composition to zinc sulfide. In contrast to most conventional sulfur removal processes (e.g., hydrodesulfurization), substantially none of the sulfur removed from the sulfur-containing feed stream is converted to hydrogen sulfide. Rather, in one embodiment, the desulfurized effluent stream exiting reactor 636 via conduit 603 can comprise less than about 200 weight percent, less than about 150 weight percent, or less than the total amount by weight of hydrogen sulfide contained in the sulfur-containing feed stream in conduit 602.

According to one embodiment, the desulfurization zone of reactor 636 can have an overall sulfur removal efficiency greater than about 50 percent, greater than about 80 percent, greater than about 90 percent, or greater than about 95 percent, wherein sulfur removal efficiency is defined according to the following formula: (mass of sulfur entering reactor 636 via stream 602–mass of sulfur exiting reactor 636 via stream 603)/(mass of sulfur entering reactor 636 via stream 602), expressed as a percentage. In general, the desulfurized effluent stream exiting reactor 636 can have an atomic sulfur content less than about 50 ppmw, less than about 20 ppm, less than about 15 ppmw, less than about 10 ppmw, or less than 5 ppmw, based on the total weight of the stream.

After removing at least a portion of the sulfur from the hydrocarbon feed stream in the desulfurization zone of reactor 636, the now sulfur-laden sorbent and desulfurized hydrocarbon effluent stream can be separated according to any manner or method known in the art. Examples of solid/fluid separation mechanisms include, but are not limited to, cyclonic devices, settling chambers, impingement devices, filters, and combinations thereof. Once the desulfurized hydrocarbon effluent stream exits reactor 636 via conduit 603, at least a portion of the stream can be cooled and condensed using downstream processing equipment (not shown).

As illustrated in FIG. 6, the separated, sulfur-laden sorbent particles can be routed via conduit 637 to a first receiver 638. In one embodiment, first receiver 638 can be a holding or storage vessel. In another embodiment, receiver can comprise a stripper zone operable to remove a portion or substantially all of the residual hydrocarbon material from the sorbent particles. The stripping zone can employ a stripping agent (e.g., nitrogen) and can be operated at a temperature in the range of from about 35° C. (95° F.) to about 535° C. (995° F.) and a pressure in the range of from about 275 kPa (39.9 psia) to about 3,550 kPa (515 psia), Stripping can be carried out for a period of time sufficient to achieve the desired level of stripping, which can generally be in the range of from about 0.1 to about 4 hours or about 0.3 to 1 hour.

As illustrated in FIG. 6, the sulfur-laden sorbent can then be transported via conduit 639 to a fluidized bed regenerator 640, wherein at least a portion of the sorbent can be regenerated via contact with a regeneration gas stream under regenerating conditions. In one embodiment, the regeneration can be carried out at a temperature in the range of from about 95° C. (203° F.) to about 815° C. (1499° F.), about 260° C. (500° F.) to about 650° C. (1202° F.), or 455° C. (851° F.) to 590° C. (1094° F.) and a pressure in the range of from about 175 kPa (25.4 psia) to about 10,450 kPa (1515.6 psia), or 205 kPa (29.7 psia) to about 795 kPa (115 psia). Typically, the regeneration can be carried out for a period of time in the range of from about 0.1 to about 24 hours or 0.3 to 5 hours.

In general, the oxygen-containing regeneration gas stream introduced into the regeneration zone of regenerator 640 can promote the conversion of at least a portion of the zinc sulfide associate with the sulfurized sorbent to zinc oxide, can promote the return of at least a portion of the promoter metal component to its common oxidized (i.e., unreduced) state, and can burn any residual hydrocarbon deposits present in or on the sorbent particles.

In one embodiment, the unreduced promoter metal component of the regenerated sorbent can comprise a substitutional solid metal oxide solution characterized by the formula $M_X Zn_Y O$, wherein M is the promoter metal and X and Y are in the range of from about 0.01 to about 0.99. In one embodiment, X can be in the range of from about 0.5 to about 0.9, about 0.6 to about 0.8, or 0.65 to 0.75 and Y can be in the range of from about 0.10 to about 0.5, about 0.2 to about 0.4, or 0.25 to 0.35. In general, $X+Y=1$. Table 3, below, summarizes an unreduced sorbent composition according to one embodiment of the present invention.

TABLE 3

| | Unreduced Sorbent Composition (wt %) | | | |
|---|---|---|---|---|
| Range | ZnO | $M_X Zn_Y O$ | PE | $M_Z Zn_{(1-Z)} Al_2 O_4$ |
| Broad | 10-90 | 5-70 | 2-50 | 2-50 |
| Intermediate | 20-70 | 10-60 | 5-30 | 5-30 |
| Narrow | 35-45 | 25-35 | 10-20 | 10-20 |

As shown in FIG. 6, new "fresh" sorbent can be added into regenerator 640 via a new sorbent inlet 670. In one embodiment, a majority of the fresh sorbent particles can be in reduced form. In another embodiment, at least a portion of the fresh sorbent particles can be in unreduced form. In general, new sorbent can be added in a continuous or batchwise manner in order to maintain sorbent inventories and/or overall activity level.

In one embodiment illustrated in FIG. 6, a solids-containing stream comprising a plurality of sorbent particles and a plurality of sorbent agglomerates, can be withdrawn from a sorbent outlet (not shown) of regenerator 640. As discussed previously with respect to particle system 400 depicted in FIG. 4, at least a portion of the agglomerates in the solids-containing stream in conduit 644 can be trapped and retained in agglomerate capture device 622, while substantially all of the sorbent particles can be passed therethrough into conduit 648. A stream of lift gas originating from lift gas source 690 can be injected into the agglomerated-depleted stream in conduit 448, which can thereafter be introduced into a second receiver 650. After operating desulfurization system 600 in the primary mode of operation, the system can transition into the secondary mode of operation in order to remove at least a portion of the trapped agglomerates into collection vessel 680 via agglomerate withdrawal device 624. Details concerning the primary and secondary modes of operation and steps required to move therebetween were described in detail previously with respect to FIGS. 4 and 5 and Table 1, above. Further, items in desulfurization system 600 analogous to those in particle system 400 of FIG. 4 are represented as having similar reference numerals. For example, isolation system 670 and its components can have a similar structure and can be operated in a similar manner as that previously described with respect to isolation system 470 and its components depicted in FIG. 4.

Referring back to FIG. 6, second receiver 650 can be similar in structure and function to first receiver 638, discussed in detail above. In one embodiment, second receiver 650 can be operable to remove at least a portion or substantially all of any residual oxygen contained within the regenerated sorbent composition therein.

As shown in FIG. 6, the regenerated sorbent can then be transferred via conduit 655 to a reducer 656, wherein the sorbent particles can be at least partially reduced or "re-activated" via contact with a hydrogen-containing reduction gas stream. Reduction conditions employed in the activation zone of reducer 656 can include a temperature in the range of from about 150° C. (302° F.) to about 540° C. (1004° F.), about 260° C. (500° F.) to about 480° C. (896° F.), or 315° C. (599° F.) to 455° C. (851° F.) and a pressure in the range of from about 175 kPa (25.4 psia) to about 10,450 kPa (1515.6 psia), or 205 kPa (29.7 psia) to about 795 kPa (115 psia). Typically, the average residence time of a sorbent particle in reducer 656 can be in the range of from about 0.1 hours to about 40 hours, about 0.2 hours to about 10 hours, or 0.5 hours to 1 hour. In one embodiment, the reduction gas stream comprises at least about 25 volume percent, at least about 50 volume percent, at least about 90 volume percent, or at least 95 volume percent hydrogen. Once the sorbent has been reactivated, the solid particles can be reintroduced into reactor 636 via conduit 602 and can continue on through desulfurization system 600 as discussed above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "agglomerate" refers to two or more solid particles that have fused together.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the term "closed" refers to a valve that is greater than 75 percent, greater than 85 percent, greater than 95 percent, or greater than 99 percent closed.

As used herein, the term "cracked-gasoline" denotes a mixture of hydrocarbons boiling in a range of from about 35° C. to about 260° C., or any fraction thereof, that are products of either thermal or catalytic processes that crack larger hydrocarbon molecules into smaller molecules.

As used herein, the term "diesel fuel" denotes a mixture of hydrocarbons boiling in a range of from about 150° C. to about 400° C., or any fraction thereof.

As used herein, the term "gasoline" denotes a mixture of hydrocarbons boiling in a range of from about 35° C. to about 260° C., or any fraction thereof.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

As used herein, the term "reduced-valence promoter metal component" referes to a promoter metal component having a valence with is less than the valence of the promoter metal component in its common oxidized state.

As used herein, the term "regeneration conditions" refer to conditions necessary to remove at least a portion of sorbed sulfur from the sulfur-laden sorbent.

As used herein, the term "sorb" refers to any type or combination of physical and/or chemical adsorption and/or absorption.

Claims Not Limited to the Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for removing agglomerated solids from a solids-containing stream, said process comprising:
   (a) passing said solids-containing stream from a first vessel to an agglomerate removal device via a first conduit, wherein said solids-containing stream comprises a plurality of solid particles and a plurality of solid agglomerates, wherein each of said agglomerates is formed from two or more solid particles that have fused together;
   (b) trapping at least a portion of said agglomerates in said agglomerate removal device to thereby provide a plurality of trapped agglomerates and an agglomerate-depleted stream;
   (c) passing at least a portion of said agglomerate-depleted stream to a second vessel via a second conduit; and
   (d) removing at least a portion of said trapped agglomerates from said agglomerate removal device,
   wherein said removing of step (d) is accomplished without physically decoupling said first conduit from said first vessel,
   wherein said removing of step (d) is accomplished without physically decoupling said first conduit from said agglomerate removal device,
   wherein said removing of step (d) is accomplished without physically decoupling said second conduit from said agglomerate removal device, and
   wherein said removing of step (d) is accomplished without physically decoupling said second conduit from said second vessel.

2. The process of claim 1, further comprising, prior to step (d), isolating said agglomerate removal device from fluid flow communication with said first and said second vessels via an isolation system, wherein said isolation system comprises a first isolation device fluidly disposed in said first conduit between said first vessel and said agglomerate removal device and a second isolation device fluidly disposed in said second conduit between said agglomerate removal device and said second vessel, wherein said isolating includes adjusting said first and said second isolation devices.

3. The process of claim 2, wherein said removing of step (d) further comprises passing a purge gas stream through said agglomerate removal device to fluidize at least a portion of said trapped agglomerates.

4. The process of claim 3, wherein said passing of said solids-containing stream is carried out in a first direction, wherein said passing of said purge gas is carried out in a second direction, wherein said second direction and said first direction are substantially opposite.

5. The process of claim 2, further comprising, subsequent to step (d), reestablishing fluid flow communication between said first vessel, said second vessel, and said agglomerate removal device by adjusting said first and said second isolation devices.

6. The process of claim 1, wherein said agglomerate removal device has a particle removal efficiency less than 5 percent, wherein said agglomerate removal device has an agglomerate removal efficiency greater than 65 percent.

7. The process of claim 1, wherein said agglomerate-depleted stream comprises substantially all of said solid particles present in said solids-containing stream.

8. The process of claim 7, further comprising contacting at least a portion of said particles in said agglomerate-depleted stream with a hydrogen-containing reducing stream in a reducing vessel.

9. The process of claim 1, wherein said first vessel is a fluidized bed regenerator.

10. The process of claim 1, wherein said agglomerate removal device comprises an agglomerate capture device and an agglomerate withdrawal device.

11. The process of claim 10, wherein said agglomerate capture device comprises an agglomerate capture surface, wherein said agglomerate capture surface defines a first side and a second side, wherein said first side defines a plurality of apertures, wherein said agglomerate capture surface is shiftable between a first position where said first side is in fluid flow communication with said first and/or said second conduits and a second position wherein said second side is in fluid flow communication with said first and/or said second conduits.

12. The process of claim 11, wherein said agglomerate withdrawal device comprises a flow control device.

13. The process of claim 12, wherein said flow control device is a piston-type valve, wherein said piston-type valve comprises an agglomerate withdrawal outlet and a retractable piston, wherein said retractable piston is shiftable between a first piston position where said agglomerate withdrawal outlet is isolated from fluid flow communication with said second conduit and a second piston position where said agglomerate withdrawal outlet is in fluid flow communication with said agglomerate withdrawal outlet.

14. The process of claim 1, wherein said solid particles comprise sorbent particles.

15. The process of claim 14, further comprising adding fresh sorbent particles to said solids processing system, wherein said solid particles passed from said first vessel to said agglomerate removal device in said solids-containing stream comprise at least a portion of said fresh sorbent particles.

16. The process of claim 14, wherein said sorbent particles comprise zinc oxide and a reduced-valence promoter metal.

17. The process of claim 14, wherein said sorbent particles have an average particle size in the range of from about 1 micron to about 500 microns.

18. The process of claim 10, wherein said agglomerate removal device is oriented substantially vertically, wherein said agglomerate capture device is located at a lower vertical elevation than said agglomerate withdrawal device.

* * * * *